United States Patent
Kaland

(10) Patent No.: US 11,083,359 B2
(45) Date of Patent: Aug. 10, 2021

(54) GRID DEVICE

(71) Applicant: SWANTECH AS, Kleppestø (NO)

(72) Inventor: Torkild Kaland, Bergen (NO)

(73) Assignee: AVA OF NORWAY AS, Kleppestø (NO)

(*) Notice: Subject to any disclaimer, the term of this patent is extended or adjusted under 35 U.S.C. 154(b) by 104 days.

(21) Appl. No.: 16/611,173

(22) PCT Filed: May 4, 2018

(86) PCT No.: PCT/NO2018/050119
§ 371 (c)(1),
(2) Date: Nov. 5, 2019

(87) PCT Pub. No.: WO2018/203758
PCT Pub. Date: Nov. 8, 2018

(65) Prior Publication Data
US 2020/0060511 A1  Feb. 27, 2020

(30) Foreign Application Priority Data
May 5, 2017  (NO) .................................. 20170747

(51) Int. Cl.
*A47L 13/50* (2006.01)
*D06F 3/02* (2006.01)
(Continued)

(52) U.S. Cl.
CPC .............. *A47L 13/50* (2013.01); *A47L 23/24* (2013.01); *B01D 29/0004* (2013.01);
(Continued)

(58) Field of Classification Search
CPC ......... A46B 17/00; A46B 17/06; A47L 13/50; A47L 13/54; A47L 13/58; A47L 23/24;
(Continued)

(56) References Cited

U.S. PATENT DOCUMENTS 53,997 A * 4/1866 Lozier .............................. 15/238
193,972 A * 8/1877 Liebmann ....................... 68/228
(Continued)

FOREIGN PATENT DOCUMENTS

CN 204110778 U 1/2015
DE 19804493 A1 8/1999
(Continued)

OTHER PUBLICATIONS

Patent Cooperation Treaty, Notification of Transmittal of the International Search Report and the Written Opinion of the International Searching Authority, or the Declaration, dated Aug. 16, 2018, International Application No. PCT/NO2018/050119, Applicant: Swantech AS.
(Continued)

*Primary Examiner* — Mark Spisich
(74) *Attorney, Agent, or Firm* — Flener IP & Business Law; Zareefa B. Flener

(57) ABSTRACT

The present invention relates to a filtering divider that helps create two regions of liquid cleanliness inside of a container. The liquid on top of the filtering divider will be cleaner than that below the filtering divider. This is achieved using a grate that is comprised of a plurality of grid elements. The filtering divider can optionally be arranged such that it may fold. In such a way, it can be placed in the bottom of a container and provide cavities for the storage of cleaning accessories.

27 Claims, 5 Drawing Sheets

(51) Int. Cl.
*A46B 17/06* (2006.01)
*B01D 29/03* (2006.01)
*A47L 23/24* (2006.01)
*B01D 29/00* (2006.01)

(52) U.S. Cl.
CPC .............. *A46B 17/06* (2013.01); *B01D 29/03* (2013.01); *D06F 3/02* (2013.01)

(58) Field of Classification Search
CPC ..... D06F 3/00; D06F 3/04; D06F 3/02; Y10S 15/09; B01D 29/004; B01D 29/0095; B01D 29/01; B01D 29/03; B01D 29/05; B01D 2029/033; B01D 35/027; B01D 2201/04; B01D 2201/0415; B01D 2201/605; B44D 3/12; B05C 21/00
USPC ........ 15/142, 104.92, 257.01, 264, 238–240, 15/257.05, 257.06, 260, DIG. 9; 210/162–164, 483, 485, 499; 68/223, 68/226, 228, 229, 233, 241
See application file for complete search history.

(56) References Cited

U.S. PATENT DOCUMENTS

| | | | | |
|---|---|---|---|---|
| 557,966 | A * | 4/1896 | Cannon | ............................ 68/229 |
| 1,373,980 | A * | 4/1921 | Shults | ........................ D06F 1/04 68/233 |
| 2,114,891 | A * | 4/1938 | Vaughn | ................... A47L 13/58 15/260 |
| 3,605,166 | A * | 9/1971 | Chen | ...................... B60N 3/044 15/215 |
| 5,584,901 | A | 12/1996 | Bakharev et al. | |
| 6,000,094 | A * | 12/1999 | Young | ..................... A47L 13/58 15/260 |
| 2003/0136720 | A1 | 7/2003 | Lamb | |
| 2006/0000046 | A1* | 1/2006 | Wren | .................... B44D 3/126 15/257.06 |
| 2017/0065911 | A1 | 3/2017 | Schneider | |
| 2018/0085687 | A1* | 3/2018 | Schneider | .......... B01D 21/2483 |

FOREIGN PATENT DOCUMENTS

| | | | |
|---|---|---|---|
| DE | 102007059920 A1 | | 6/2009 |
| EP | 870441 | * | 10/1998 |
| GB | 2239388 | * | 7/1991 |
| GB | 2431863 A | | 5/2007 |
| JP | 2008-220543 | * | 9/2008 |
| WO | 9918837 A1 | | 4/1999 |

OTHER PUBLICATIONS

Norwegian Search Report, Patentsøknads nr. 20170747, Description Received: May 5, 2017.

* cited by examiner

GRID DEVICE

THE FIELD OF THE INVENTION

The present invention relates to a grid device and, more particularly, a grid device adapted to be positioned in a container with a fluid, preferably a liquid. The grid device controls currents in the fluid and facilitates flow of pollutions in the fluid in one direction over the grid. The fluid above the grid device will be cleaner than the fluid below the grid device. Associated devices and systems are also presented.

More specifically, the present invention relates to a grid device comprising a grate with a top surface, a bottom surface, and a plurality of grid elements arranged in a plane along the grate, wherein the grid elements comprise a top opening of a width of $d_{top}$ in the top surface and a bottom opening of width $d_{bottom}$ in the bottom surface.

BACKGROUND AND TECHNICAL PROBLEM TO BE SOLVED

It is very common to wash a dirty surface using a container that is filled with liquid. A ready example of this is the washing of a car using soap, sponge, and a container filled with water.

In most cases, it is of interest that the water that is used for the washing contains as little pollution as possible. Particles of a certain size may cause harm or damages if the work system requires usage of homogenous liquid.

It is a commonly understood problem that as dirt and other particulate matter is washed from the surface to be cleaned; it will make the water dirtier. In a setting where one cleans by usage of used water from a container in such manner that particles are transferred to the water, causing pollution, and motion in the water flow creates a mix of liquid with particles of various sizes with reduced utility value and increased risk of damage.

This can be solved in a number of ways. The most common is to simply change the water. However, this may be quite resource-demanding concerning working time, effort and water and also supplement in the water e.g. soap, resulting in work inefficiency and strain.

Another way is to avoid using a water container all together and to use a hose or other continuous clean water supply; sometimes with a built-in cleaning tool. Not only is this a large waste of water, but it is also not a portable solution.

It is also possible to vibrate, or in other ways agitate the water. In this way, particulate matter is aided in falling to the bottom of the bucket. This requires both an external power source and an extra input of energy into the system.

If liquid contains particles of various sizes where it is of interest that these particles sink to the bottom and remains there, there is needed a way to ensure the particles being kept at the bottom measures so the upper measure of the water remains as non-polluted as possible. This should preferably be obtained without overly frequent changing of the liquid, the continuous supplying of fresh liquid, agitation of the container, or application of a power source.

It is a purpose of the present invention to provide a container with a grid device so that the liquid above the grid device in the container remains clean. It is thus a purpose of the present invention to provide a grid device that will reduce the current of liquid below and above the grid and thus also reduces the flow of liquid through the grid. Further, it is a purpose of the invention that the grid device facilitates transport of polluted liquid through the grid in one direction.

SHORT SUMMARY OF THE INVENTION

A first aspect of the present invention relates to a grid device comprising a grate with a top surface, a bottom surface, and a plurality of grid elements arranged in a plane along the grate, wherein the grid elements comprise a top opening of a width of $d_{top}$ in the top surface and a bottom opening of width $d_{bottom}$ in the bottom surface; wherein the grid elements further comprise a plurality of walls that extend from the edges of the top opening on the top surface of the grate to the corresponding edges of the bottom opening (22) on the bottom surface of the grate; and wherein $d_{top}$ is larger than $d_{bottom}$.

In a preferred embodiment is $d_{top}$ from 25% to 70% larger than $d_{bottom}$, preferably between 40% and 65%, most preferably between 45% and 60%.

In a preferred embodiment is $d_{top}$ 30 mm to 5 mm, preferably between 25 mm and 10 mm, more preferably between 18 mm and 12 mm.

In a preferred embodiment is $d_{bottom}$ 5 mm to 30 mm, preferably between 6 mm and 25 mm, more preferably between 7 mm and 20 mm.

In a preferred embodiment has the grate a thickness of $d_{grate}$ that is 15% to 150% of the size of $d_{top}$, preferably 30% to 100%, most preferably 50% to 70%.

In a preferred embodiment is $d_{grate}$ 5 mm to 30 mm, preferably 6 mm to 25 mm, most preferably 7 mm to 20 mm.

In a preferred embodiment are the top opening and bottom opening of the grid elements polygons, preferably a polygon with 3 or more sides, more preferably 3 to 12 sides, even more preferably 4 to 8 sides, most preferably 6 sides.

In a preferred embodiment is the plurality of grid elements disposed along the grate in such a manner that the each grid element shares one or more common edges with grid elements surrounding it.

In a preferred embodiment extend the two or more supports in a transverse direction from the grate.

In a preferred embodiment are the two or more supports arranged such that the grate is at a cant angle θ with respect to a level plane.

In a preferred embodiment is one or more curved support dampeners arranged on the bottom surface of the grate.

In a preferred embodiment comprises the grate one or more folding axes defined by one or more folding means; along which the grate can fold.

In a preferred embodiment is each grid element along the folding axis divided into two or more pieces except at the top surface 10A of the grate.

In a preferred embodiment are the supports or support dampeners adapted to form cavities in the bottom surface.

A second aspect of the present invention relates to a cleaning system comprising a container and a grid device comprising a grate with a top surface, a bottom surface, and a plurality of grid elements arranged in a plane along the grate, wherein the grid elements comprise a top opening of a width of $d_{top}$ in the top surface and a bottom opening of width $d_{bottom}$ in the bottom surface; wherein the grid elements further comprise a plurality of walls that extend from the edges of the top opening on the top surface of the grate to the corresponding edges of the bottom opening (22) on the bottom surface of the grate; and wherein $d_{top}$ is larger than $d_{bottom}$, wherein the grid device is arranged inside the container.

In a preferred embodiment is $d_{top}$ from 25% to 70% larger than $d_{bottom}$, preferably between 40% and 65%, most preferably between 45% and 60%.

In a preferred embodiment is $d_{top}$ 30 mm to 5 mm, preferably between 25 mm and 10 mm, more preferably between 18 mm and 12 mm.

In a preferred embodiment is $d_{bottom}$ 5 mm to 30 mm, preferably between 6 mm and 25 mm, more preferably between 7 mm and 20 mm.

In a preferred embodiment has the grate a thickness of $d_{grate}$ that is 15% to 150% of the size of $d_{top}$, preferably 30% to 100%, most preferably 50% to 70%.

In a preferred embodiment is $d_{grate}$ 5 mm to 30 mm, preferably 6 mm to 25 mm, most preferably 7 mm to 20 mm.

In a preferred embodiment are the top opening and bottom opening of the grid elements polygons, preferably a polygon with 3 or more sides, more preferably 3 to 12 sides, even more preferably 4 to 8 sides, most preferably 6 sides.

In a preferred embodiment is the plurality of grid elements disposed along the grate in such a manner that the each grid element shares one or more common edges with grid elements surrounding it.

In a preferred embodiment extend the two or more supports in a transverse direction from the grate.

In a preferred embodiment are the two or more supports arranged such that the grate is at a cant angle θ with respect to a level plane.

In a preferred embodiment is one or more curved support dampeners arranged on the bottom surface of the grate.

In a preferred embodiment comprises the grate one or more folding axes defined by one or more folding means; along which the grate can fold.

In a preferred embodiment is each grid element along the folding axis divided into two or more pieces except at the top surface 10A of the grate.

In a preferred embodiment are the supports or support dampeners adapted to form cavities in the bottom surface.

In a preferred embodiment is the container arranged such that the bottom surface of the grate rests upon one or more grate support that is arranged at a distance above the bottom of the container.

If a cross-section of the container has a circular shape, the currents in the liquid will often establish a cyclone effect that is not wanted. The container has thus in preferred embodiments none circular cross-sections, i.e. a horizontal cross-section of the container is thus preferably formed as a square or rectangular.

The present invention has several advantages over previous solutions to the technical problems discussed previously.

The present invention is a grid device that comprises a grating that is comprised of filtering elements. Due to the shape of the grid elements, the liquid above the grating will be cleaner than the liquid below the grid elements. This allows for less frequent changes of liquid in the container.

This solution does not rely upon a continuous supply of clean water. Additionally, the container need not be agitated to encourage particulate matter to fall to the bottom of the container.

During the use of a container filled with liquid, liquid currents will occur within the container. These currents will stir up sediment that has settled to the bottom of the container, making the liquid dirtier than if the sediment had not been disturbed. The present invention optionally comprises dampeners that reduce the size and strength of both surface waves and circular currents within the container.

DETAILED DESCRIPTION OF THE INVENTION

Using the attached drawings, the technical contents, and detailed descriptions, the present invention is described. Alternate embodiments will also be presented.

The present invention is a type of grating. It is meant to be submerged in a container of liquid. The grate is made up of multiple grid elements. One of the key features of these elements is that they have a larger opening on the top than the bottom. This helps in keeping the liquid above the grating cleaner than that below the grating. Further, the grid elements in the grid device will also reduce the currents in the liquid above and below the grid.

Figure 1:
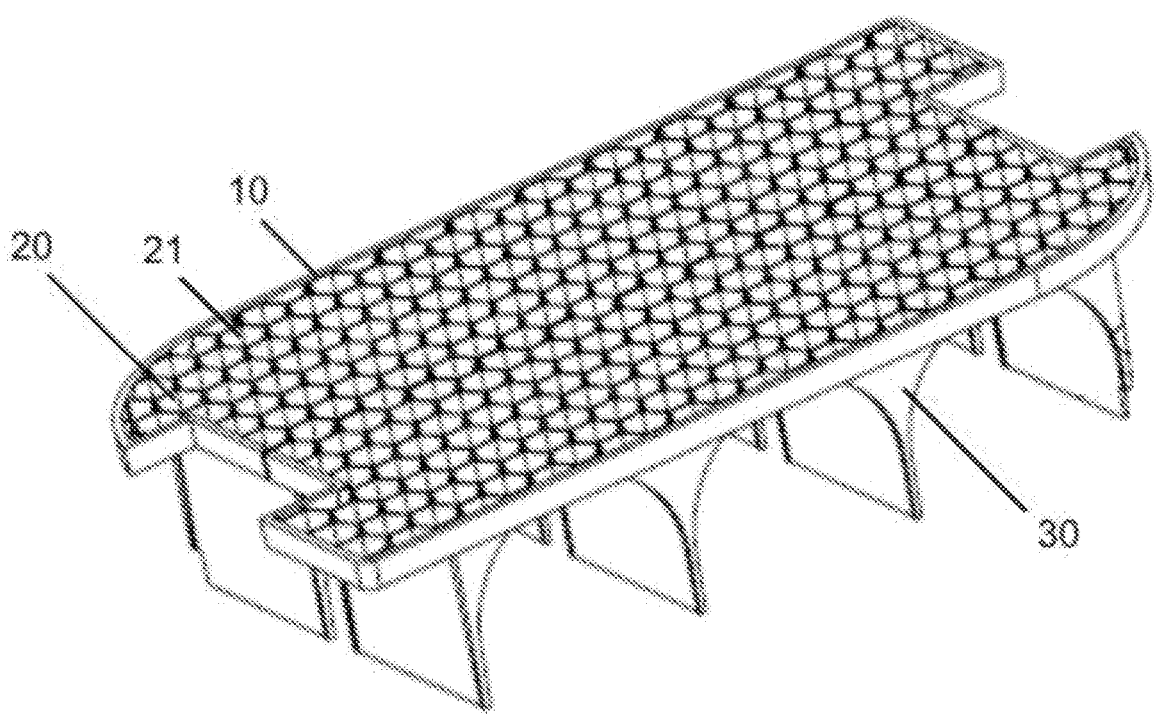
FIG. 1 discloses a perspective view of an embodiment of the present invention.

Reference is made to FIG. 1. This figure discloses a perspective view of an embodiment of the present invention. A grate 10 is made up of multiple grid elements 20. A series of supports 30 are affixed to the bottom of the grate 10 at an approximately 90 degree angle to the grate's 10 surface. The purpose of these supports is to allow for the grate to be held in place at a desired height above the bottom of a container 40 (not shown in FIG. 1).

I order to obtain an effective grid device, i.e. a device that reduces the currents in the liquid above and below the grid, and which also facilitates transport of water from the upper side of the grid to below the grid, the grid device comprises one of, or preferably all of the following features;

The top opining of the grid elements are larger than the bottom opening allowing easy entrance for sinking sediments The bottom opening of the grid elements are narrow, which makes entrance of rising sediments difficult High packaging of grid elements reduces the surface area of the top surface, and leaves little surface area available for settling of sinking sediments, ensuring the sediment to pass the grid and not settle on the grid surface As much total surface area as possible in order to reduce currents in the liquid A large contact area against the liquid in order to increase the friction in the water and reduce the currents.

The grid elements 20 are shown as a regular (all sides are equal length) hexagon when viewed in cross section from above. Such a shape allows for a high packing efficiency of grid elements 20 along the grate 10. This minimizes the resistance to liquid flow during the operation of the present invention. There are a number of other polygon shapes that will also result in a very high packing efficiency and low liquid flow resistance. If the shape of the top openings 21 is limited to a regular polygon of a single type, the shape to that of a triangle, square, or hexagon are the preferred embodiments. If two different regular polygons are to be used, octagons with squares, triangles with squares, dodecagons with triangles, and hexagons with triangles are preferred embodiments. If three different regular polygons are to be used the preferred combinations are: (a) hexagon, triangle, and square; (b) dodecagon, hexagon, and square.

However, while a hexagon is the most preferred embodiment, and the previously mentioned polygons additional preferred embodiments, these are not the only shapes that would allow for a high packing efficiency. Any polygon (regular or not) would work. While straight edges are preferable for the top of the grid elements 20, this is mainly for manufacturing simplicity. However, it is important to note that the choice to use a regular polygon is not a technical requirement nor is it a manufacturing one. One skilled in the art could easily calculate the size(s) and shapes(s) needed. This is a well-known mathematical problem from Euclidean and non-Euclidean shape tiling studies.

Each of the grid elements 20 of the grate 10 are shown to share common edges. This reduces manufacturing costs as less material is needed to form the grid elements 20. While this is the preferred embodiment, the edges between the grid elements could also be separated. This could be because of structural strength reasons or because more than a single shape or size of grid element 20 is used. For example, if a regular octagon is used as the shape of the grid element 20, there will be squares that are located between the diagonal corners of the individual grid elements 20. Using a grate 10 with different shaped grid elements 20 may be useful if different types of undesired matter reside on the surface to be cleaned (e.g. spackle and dirt).

While FIG. 1 shows the invention with supports 30, this is not necessary. While the grate 10 would need to be located above the bottom of the container 40 (not shown) of the liquid when in use, this need not be done using a physical support on the grate 10. It could be accomplished in a number of ways. The supports 30 could be molded into a container that the grate 10 is placed upon.

The supports 30 could easily be a separated such that they were no longer affixed to the grate 10. In that case the supports 30 would be placed first and then the grate 10 placed upon it. This could be useful if the two different components were made from different materials. This could also be important if the same grate 10 was to be used in multiple containers of different dimensions. The grate 10 could also be placed at the correct height through suspension or other upward force from the edge of a container 40 (not shown).

The supports 30 are shown in FIG. 1 with a curved front. These curves are not strictly necessary. They provide extra strength and control of liquid currents within a container. For maximum efficiency, the supports 30 should be attached in such a way, and be of a size, such that there is not a significant reduction of liquid flow through the grid elements 20. However, thick supports 30 that block one or more grid elements 20 will still allow the invention to function as intended, just not as efficiently.

The invention is shown in FIG. 1 with a total of 8 supports 30. These supports 30 are shown to be arranged parallel to the short axis of the grate 10. The number of supports is simply an example. If the supports 30 are used, they must be sufficient to hold the grate 10 at the desired height in the container. This can be accomplished by using a single support 30 if desired. Open gaps are shown between the supports 30, but it would be possible to have one or more covering pieces that are along the front between the supports 30. This could possibly lend increased strength to the invention.

The supports 30 are shown as two separate pairs along the same axis. This is not necessary, but in a preferred embodiment, the grate 10 folds and these supports 30 are therefore divided.

Figure 2:
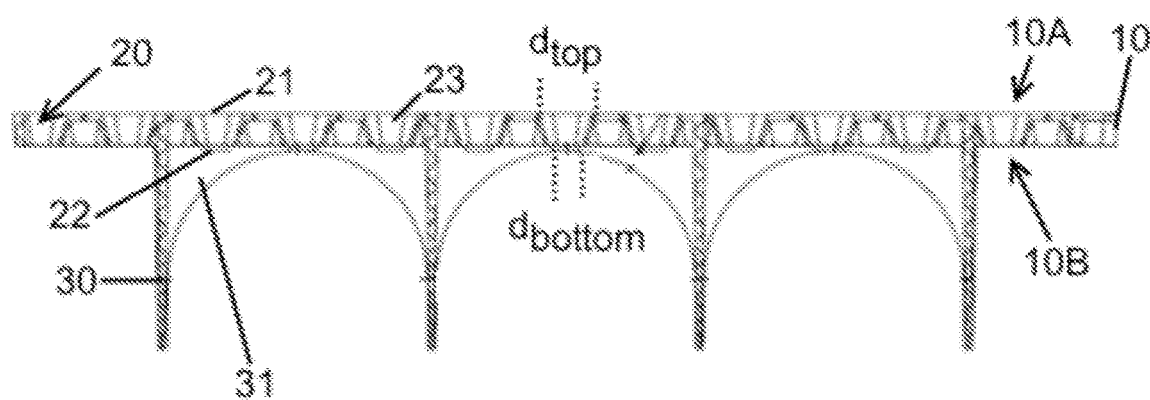
FIG. 2 discloses a cross sectional side view of an embodiment of the present invention.

Reference is made to FIG. 2. This figure discloses a cross sectional side view of an embodiment of the present invention. A grate 10 with a top surface 10A and a bottom surface 10B is comprised of a number of grid elements 20. Each grid element 20 has a top opening 21 of a width $d_{top}$ and a bottom opening 22 of a width $d_{bottom}$. A wall 23 extends from each edge of the top opening 21 to each edge of the bottom opening 22. Because the top opening 21 is larger than the bottom opening 22, each wall 23 inside the grid element 20 is at an angle with respect to the top surface of the grate 10A.

A series of supports 30 are attached perpendicular to the top surface of the grate 10A. A curved support dampener 31 is attached between the openings defined by the supports 30 and the grate 10.

In the preferred embodiment, there are two support dampeners 31 between each pair of supports; one in the front of the opening and one in the back. However, as discussed previously, there is no need for a support dampener 31 to be present. If more strength was needed, then as many support dampeners could be added to meet the technical requirements of the task.

The curved nature of the support dampener 31 will help to direct the liquid in a circular manner so that as much as possible passes under the bottom surface of the grate 10B and less of the liquid to cross through the filtering elements from the bottom surface of the grate 10B to the top surface of the grate 10A. This will increase the efficiency of the present invention.

While the support dampeners 31 are shown perpendicular to the supports 30, it is possible to use support dampeners that are at an angle. Particularly, ones that pass from the front of the support 30 on one side to the back of another support 30 on the other side. The support dampeners 31 could have different shapes or different types of curves. This would depend upon the washing liquid used, the shape of the container, and the nature of the dirt to be washed off.

In an alternate embodiment of the present invention, the supports 30 are absent, but the support dampeners 31 are present. In this case the support dampeners 31 are affixed directly to the bottom surface of the grate 10B.

Figure 3:
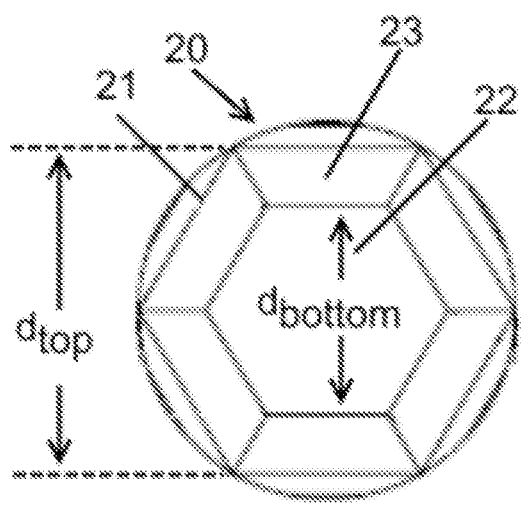
FIG. 3 discloses a top view of an individual grid element.

Reference is made to FIG. 3. This figure discloses a top view of an individual grid element 20. The grid element 20 has a regular hexagonal top opening 21 with a width of $d_{top}$. It also has a regular hexagonal bottom opening 22 with a width of $d_{bottom}$. Walls 23 extend from each edge of the top opening 21 to the corresponding bottom opening 22. Because the bottom opening 22 is smaller than the top opening 21, the wall 23 is at an angle. This angle can also be changed by varying the thickness of the grate $d_{grate}$ (not shown).

The edges of the top opening 21 could have a textured surface. This would help aid any scraping that was required. The walls 23 could also be textured. By changing the surface of the walls 23, more or less surface resistance could be applied.

In an alternate embodiment, the shapes of the top openings 21 and the bottom openings 22 need not be the same. In such a way, some of the walls 23 inside of the grid element 20 could have different angles. This would allow for some of the walls 23 to be vertical and others to have an angle.

By rotating the top opening 21 with respect to the bottom opening 22, a grid element 20 with a twisted internal profile can be achieved. This may be advantageous in achieving desirable results depending on particulate size and liquid turbidity.

Figure 4A:
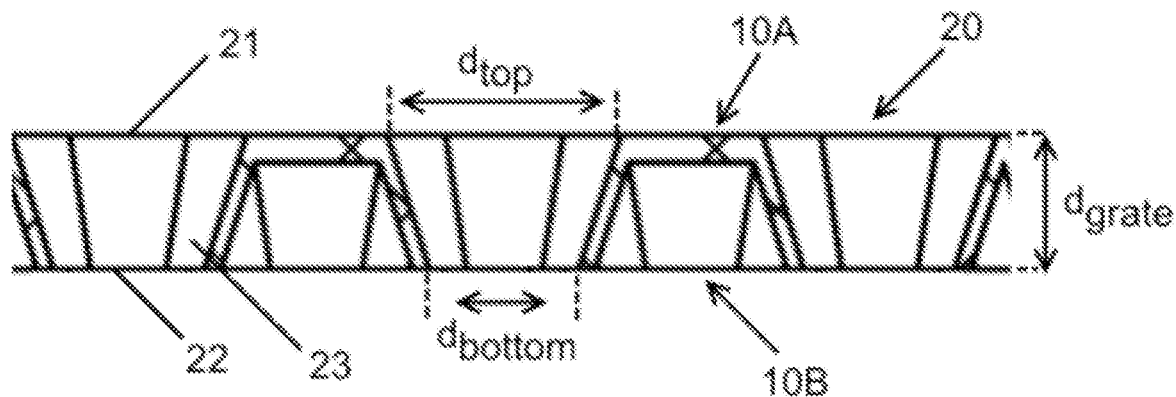
FIG. 4A discloses a cross sectional side view of the grate and with grid elements.

Reference is made to FIG. 4A. This figure discloses a cross sectional side view of the grate and with grid elements 20. The top surface of the grate 10A is made up of grid elements 20. As before, the filter 23 grid element 20 has a top opening 21 with a width of $d_{top}$ and a bottom opening 22 with a width of $d_{bottom}$. Walls 23 extend from each edge of the top opening 21 to the corresponding bottom opening 22. The grate has a thickness between the top surface of the grate 10A to the bottom surface of the grate 10B of $d_{grate}$. In the preferred embodiment of the present invention, the bottom surface of the grate 10B is on the same plane as the bottom opening 22.

Figure 4B:
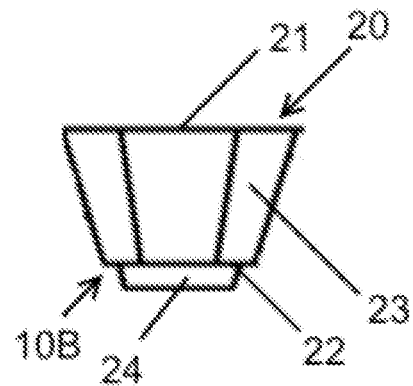
FIG. 4B discloses a cross sectional side view of an alternate embodiment of a grid element.

Reference is made to FIG. 4B. This figure discloses a cross sectional side view of an alternate embodiment of a grid element 20. In this embodiment, the bottom opening 22 of the grid element 20 has a bottom protrusion 24 that extends below the bottom surface of the grate 10B. This bottom protrusion 24 has the same shape as that of the bottom opening 22. Further, it is preferably slightly smaller than the bottom opening 22. The extra piece can help in directing the liquid flow from the top opening 21 in a more vertical manner to the bottom of the container 40 (not shown).

Figure 5:
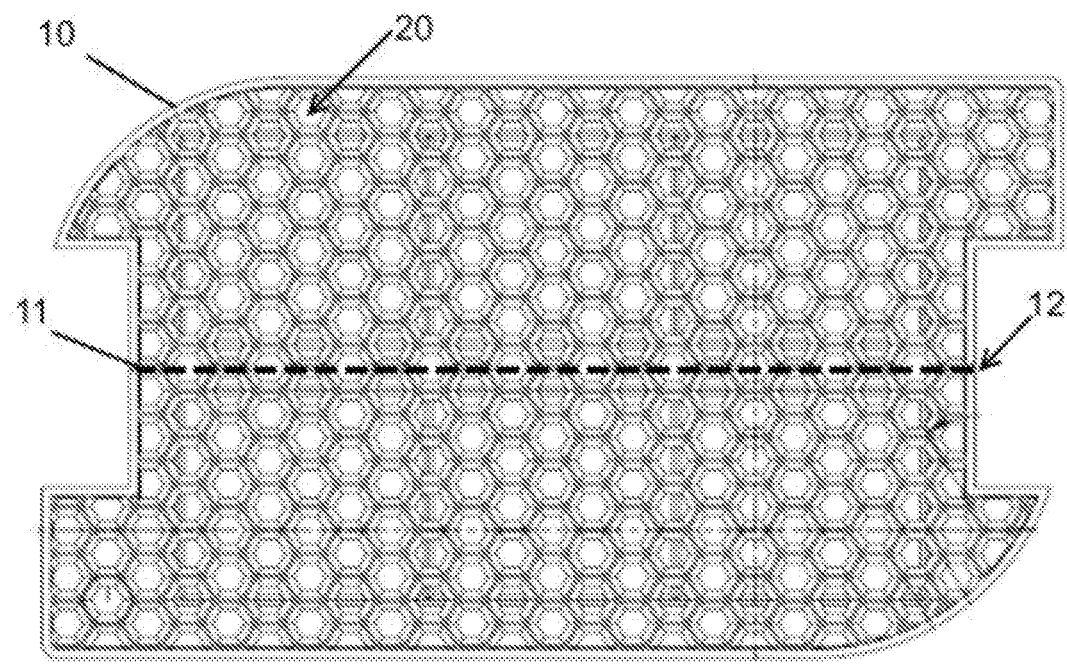
FIG. 5 discloses a top view of an embodiment of the present invention.

Reference is made to FIG. 5. This figure discloses a top view of an embodiment of the present invention. A folding means 11 is arranged; along the center of the long axis of the grate 10 in the in the preferred embodiment. This allows the grate 10 to fold along a folding axis 12 that is defined along the path of the folding means 11. There are many possible folding means. In one embodiment, the grate 10 is physically divided into multiple pieces with a hinge used to connect the multiple pieces of the grate 10 together. In the preferred embodiment the folding means 11 is formed by dividing the grid elements 20 and leaving a small piece connection at the top surface of the grate 10. This piece is flexible and will allow for folding of the grate 10 to occur. This folding means 11 is described in more detail in the discussion of FIG. 6.

The folding means can cross the entire grate 10 and can be at any angle across the surface of the grate 10. The folding axis 12 need not cross the center of the grate (along either the long or short axis) or divide the grate 10 into equal sized areas. The present invention can have multiple folding means 11 and thus multiple folding axes 12.

Figure 6:
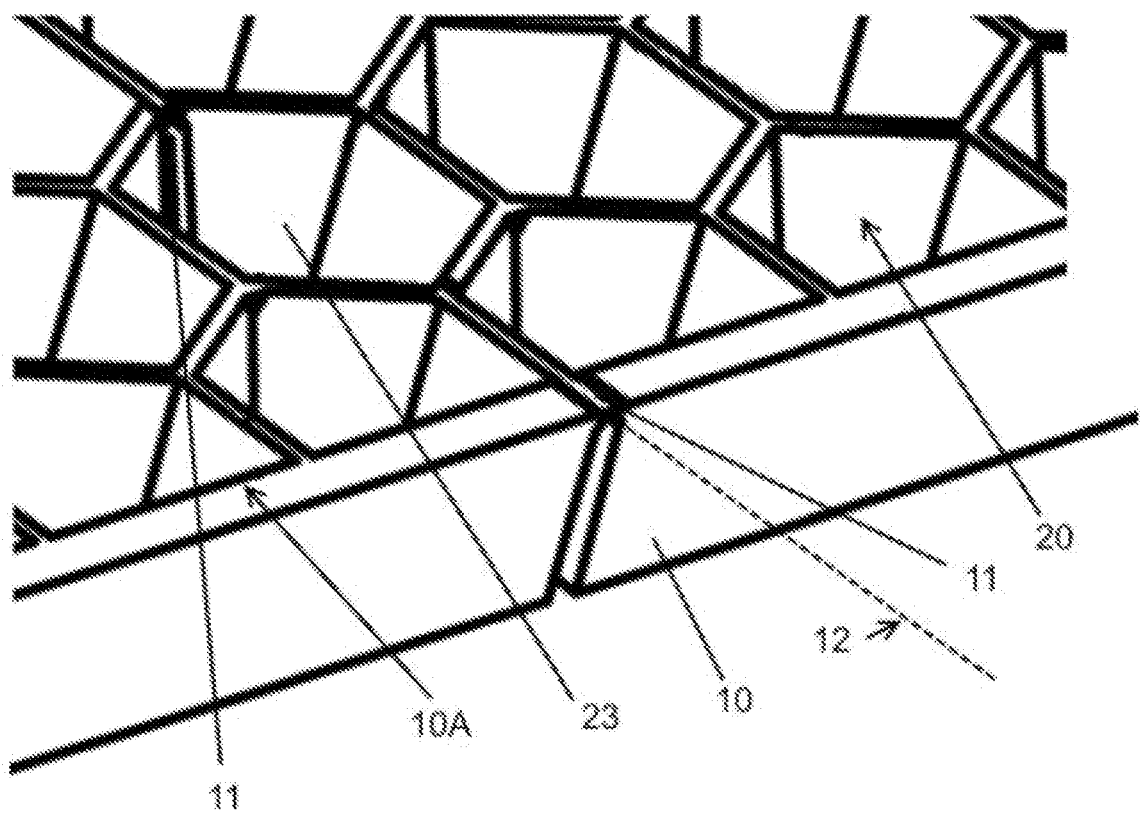
FIG. 6 discloses a perspective view of the preferred embodiment of the folding means.

Reference is made to FIG. 6. This figure discloses a perspective view of the preferred embodiment of the folding means. The grid elements 20 found along the folding axis 12 of the folding means 11 is created by dividing the walls 23 of the grid element into two pieces. However, the walls 23 are not divided through the entire grate 10. The top surface of the grate 10A is not divided. Because the material of the top surface of the grate 10A is flexible, and not divided, the grate can fold along the folding axis 12. The folding means 11 can be made of the same or different material as the rest of the grate. For example, the folding means 11 can be made of rubber, or other material that is more flexible than the rest of the grate 10.

Figure 7:
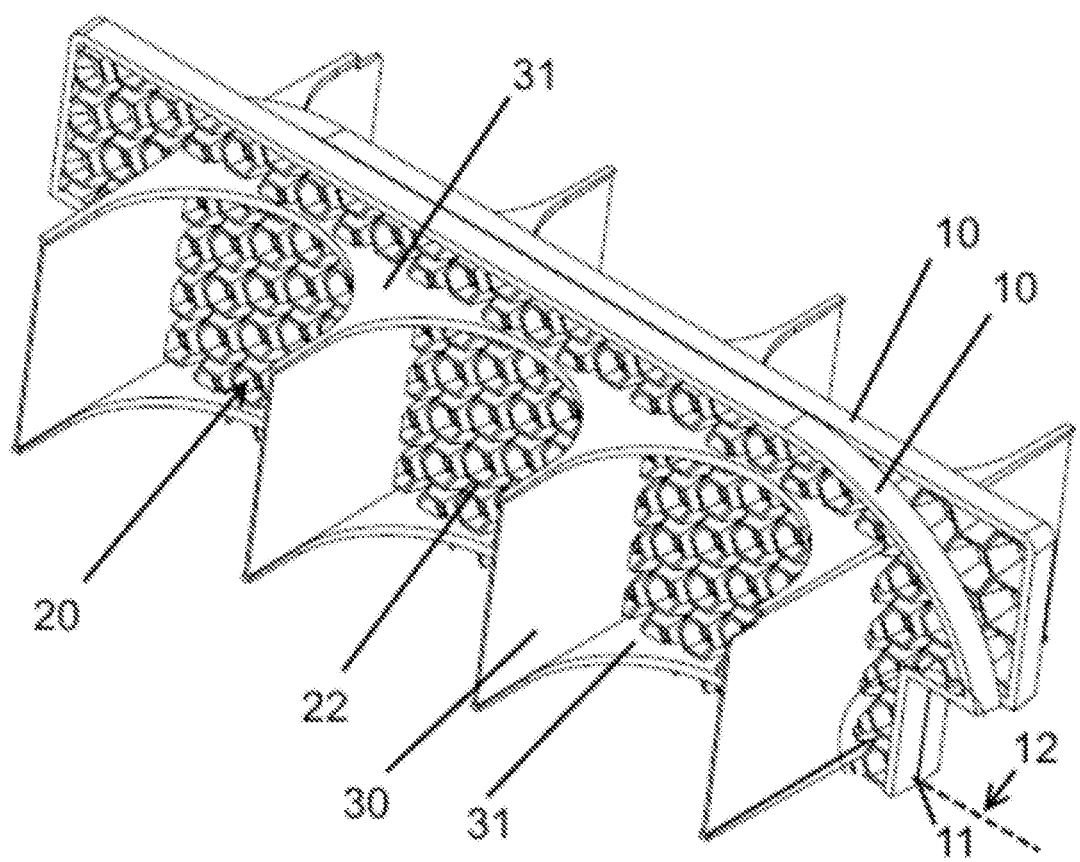
FIG. 7 discloses a perspective view of an embodiment wherein the invention has been folded.

Reference is made to FIG. 7. This figure discloses a perspective view of an embodiment wherein the invention has been folded. The grate 10 is comprised of multiple grid elements 20. It has been folded along the folding axis 12 that is defined by the path location of the folding means 11. The supports 30 and the support dampeners 31 are arranged such that individual cavities are formed. Containers of cleaning products and other cleaning aids could be placed inside these cavities.

Depending on the exact arrangement of the supports 30 and support dampeners 31, the cavities could be of different sizes and shapes.

Figure 8:
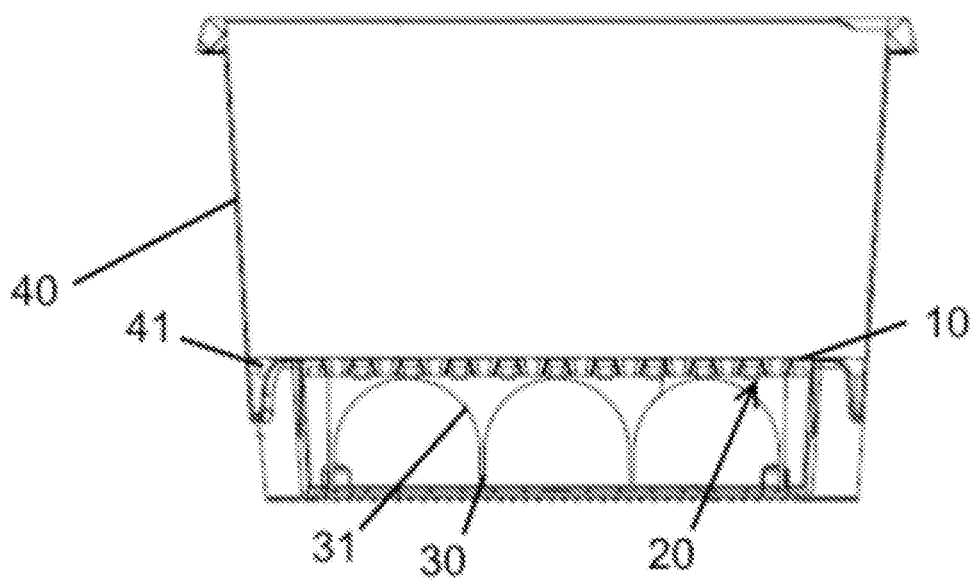
FIG. 8 discloses a cross sectional view of from the side an embodiment of the present invention in a container.

Reference is made to FIG. 8. This figure discloses a cross sectional view from the side of the present invention in a container. This is the preferred embodiment of the system that uses the present invention. The grate 10 is comprised of multiple grid elements 20 and is located inside of a container 40. The grate supports 41 hold the grate 10 at a distance from the bottom of the container 40. Supports 30 and support dampeners 31 give structural support in the middle of the grate.

In an alternate embodiment of the present invention the supports 31 and/or support dampeners 31 are removed. This reduces the amount of work involved in manufacture of the present invention.

The grate supports 41 can be arranged such that it locks the grate 10 in position inside of the container 40. The grate supports 41 can be located at different heights along the sides of the container 40. This would place the grate 10 at an angle with respect to the bottom of the container 40. The grate supports 41 could also be adjustable, such that each can be adjusted to place the grate 10 at the desired height inside the container 40.

Figure 9:
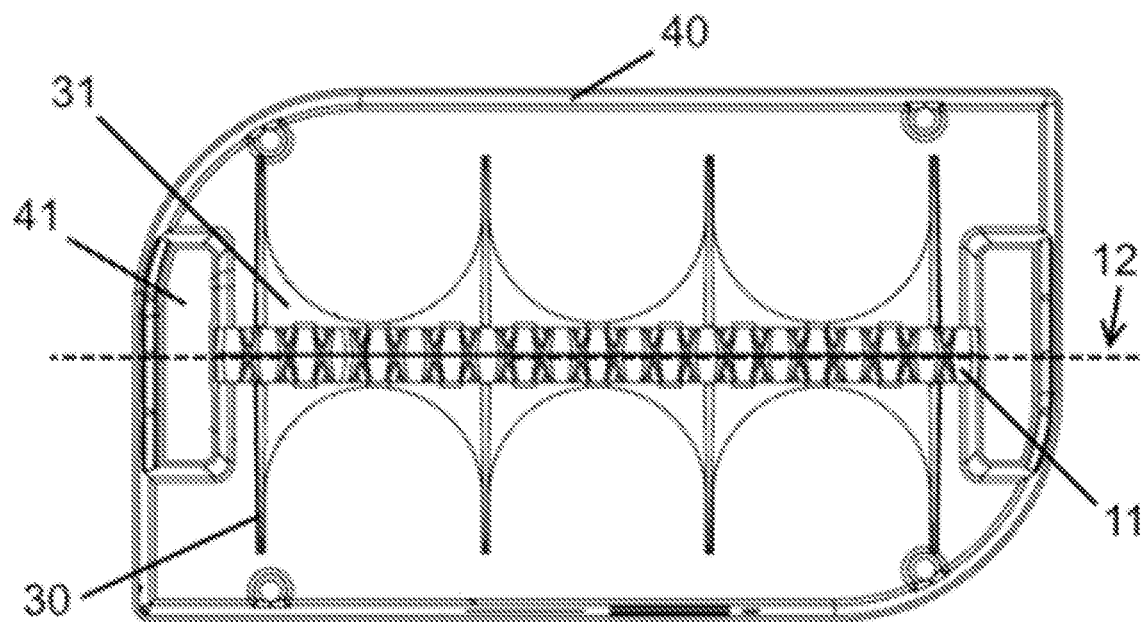
FIG. 9 discloses a cross sectional view from the bottom of an embodiment wherein the invention has been folded and placed inside a container.

Reference is made to FIG. 9. This figure discloses a cross sectional view from the bottom of the present invention. The invention has been placed inside the container 40 in a folded up position; resting upon the container supports 41. Supports 30 and support dampeners 31 create cavities when in the present invention is in the folded position. As discussed previously, the preferred embodiment of the folding means 11 is formed by dividing the grid elements 20 in pieces, except at the top surface of the grate 10A (not shown). This creates a folding axis 12 by which the present invention can fold. In the preferred embodiment, the grid elements 20 are divided along their edges.

Figure 10:
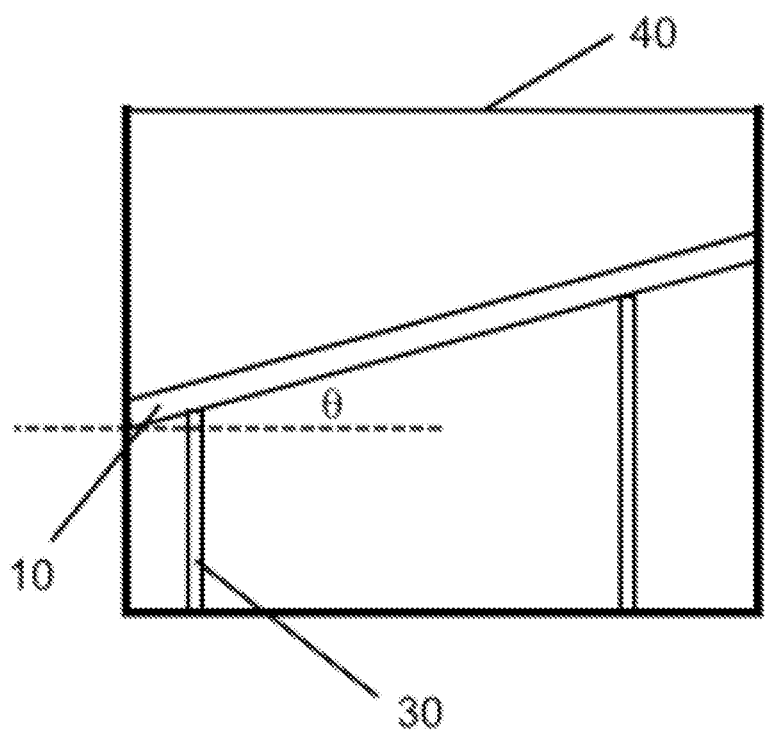
FIG. 10 discloses a side view of an alternate embodiment of the present invention in a container.

Reference is made to FIG. 10. This figure discloses a side view of an alternate embodiment of the present invention in a container. In the previous embodiments of the invention, the grate 10 is held level by the supports 30 that are underneath it. In FIG. 10, the supports are of different heights. This causes the grate to be at a cant angle θ with respect to the bottom of the container 40 that the supports 30 rest upon. The cant angle θ is shown in the figure as in a single plane. However, there is no technical limitation why there are not angles in the xy, xz, and/or yz axes.

This cant angle θ could be of an advantage in situations where it is good to have access to a different amount of liquid above the grate at different places. As an illustrative example: during the process of cleaning spackle, it is very common for large amounts of the spackle to stick to the instrument used for cleaning the surface (e.g. a sponge). If the grate 10 is at a cant angle θ, it maybe be easier to scrape the spackle off the sponge on the part of the grate 10 that is the furthest from the bottom of the container 40 (right side in FIG. 10) and has less liquid. While more liquid may make it easier to rinse out the cleaning device; making the part of the grate 10 that is closest to the bottom more desirable.

The cant angle θ between the grate 10 and the bottom of the container 40 could be fixed at manufacture, or having to one or both of the supports 30 being adjustable.

The embodiment of the invention that is shown in many of the figures has a series of cutouts on the short edges and rounding along half of the large edges. This particular embodiment demonstrates that it has been modified to fit a particular container 40; normally with grate supports 41. The cutouts serve no functional purpose for the ability of the invention to perform its designed task. The invention would function without them.

If desired, more than one layer of grid elements 20 could be placed on top of one another. This second layer of grid elements 20 could be lined up or offset with respect to the first layer of grid elements 20. This may provide a better filtering effect. What follows is a description of the preferred embodiment of the present invention. The grate 10 is comprised of a series of grid elements 20 with the shape of regular hexagon that share edges with neighboring grid elements 20. In such a way, packing efficiency is maximized and liquid flow resistance is minimized through the grate 10.

The top openings 21 of the filtering elements 20 have a width between 30 mm and 5 mm along the short side of the hexagon, preferably between 25 mm and 10 mm, more preferably between 18 mm and 12 mm, most preferably 15 mm measured along the short axis. This corresponds to a length of 8.7 mm for each edge.

The bottom openings 22 of the filtering elements 20 have a width between 5 mm and 30 mm, preferably between 6 mm and 25 mm, more preferably between 7 mm and 20 mm, most preferably 9.6 mm when measured along the short axis. This corresponds to a length of 5.6 mm for each edge.

The ratio between the top openings 21 and the bottom openings 22 is between 25% and 70% larger than $d_{bottom}$, preferably between 40% and 65%, more preferably between 45% and 60%, most preferably 56.6%.

The grate 10 has a thickness of $d_{grate}$ that is between 5 mm and 30 mm, preferably between 6 mm and 25 mm, more preferably between 7 mm and 20 mm, most preferably 10 mm.

$d_{grate}$ can be expressed as a percentage of $d_{top}$. This is thickness that is between 15% and 150% of the size of $d_{top}$, preferably between 30% and 100%, more preferably between 50% and 70%, most preferably 67%.

The supports 30 have a width of between 1 mm and 8 mm, preferably between 1.5 mm and 6 mm, more preferably between 2 mm and 3 mm, most preferably between 2.1 mm and 2.5 mm. The curved support dampeners 31 have a radius of between 20 mm and 50 mm, preferably between 25 mm and 45 mm, more preferably between 35 mm and 45 mm, most preferably 41.5 mm.

The supports 30 have a thickness of between 0.2 mm and 10 mm, preferably 0.3 mm and 5 mm, more preferably between 0.4 and 4 mm, most preferably 0.8 mm.

The distance between the supports 30 have a thickness of between 4 cm and 12 cm, between 6.5 cm and 10.5 cm, most preferably 8.5 cm. The supports 30 have a height of between 1 cm and 20 cm, preferably between 2 cm and 15 cm, more preferably 4 cm and 10 cm, of most preferably 5.8 cm.

The folding means is formed by dividing the walls 23 of the grid elements 20 by leaving a flexible edge at the top surface of the grate 10A. The thickness of the folding means 11 is between 0.2 mm and 10 mm, preferably 0.2 mm and 5 mm, more preferably between 0.4 and 4 mm, most preferably 0.3 mm.

Please note that these dimensions are presented as non-limiting examples. The size of the individual parts of the invention can easily be adapted to the specific task to be performed by one skilled in the art.

Even though the grid device is described herein as a separate system, it is meant to be able to function as a part of a system that is comprised of a container 40 and the grid device. Optionally, the grate 10 of the present invention rests on the grate supports 41 located inside of the container 40. In this manner, the folding axis 12 is along the center of the long axis of the top surface of the grate 10A.

Representative dimensions of the grate 10 are dimensions of 349.7 mm×199.7 mm. Cutouts for the grate supports 41 may be 82.5 mm×30 mm and are centered at the middle of the long axis of the grate 10. The folding means 11 is located along the center of the long axis of the grate 10. The container 40 is adapted to hold the present invention.

Please note that "step of" is not to be interpreted as "step for". "Comprised of", "comprising", "comprises" etc. refers to an open set and by "consisting of" refers to a closed set.

The invention claimed is:

1. A grid device comprising:
a grate (10) with a top surface (10A), a bottom surface (10B), and a plurality of grid elements (20) arranged in a plane along the grate (10), wherein each of the plurality of grid elements (20) comprises a top opening (21) of a width of $d_{top}$ in the top surface (10A) and a bottom opening (22) of width $d_{bottom}$ in the bottom surface (10B); wherein
each of the plurality of grid elements (20) further comprises a plurality of walls (23) that extend from the edges of the top opening (21) on the top surface (10A) of the grate (10) to the corresponding edges of the bottom opening (22) on the bottom surface (10B) of the grate (10); and wherein $d_{top}$ is larger than $d_{bottom}$; and wherein
the grate (10) comprises one or more folding axes (12) defined by one or more folding means (11) along which the grate (10) can fold.

2. The grid device of claim 1, wherein $d_{top}$ is about 25% to about 70% larger than $d_{bottom}$.

3. The grid device of claim 1, wherein $d_{top}$ is about 30 mm to about 5 mm.

4. The grid device of claim 1, wherein $d_{bottom}$ is about 5 mm to about 30 mm.

5. The grid device of claim 1, wherein the grate (10) has a thickness of $d_{grate}$ that is about 15% to about 150% of the size of $d_{top}$.

6. The grid device of claim 1, wherein the grate (10) has a thickness of $d_{grate}$ and wherein $d_{grate}$ is about 5 mm to about 30 mm.

7. The grid device of claim 1, wherein the top opening (21) and the bottom opening (22) of each of the plurality of grid elements (20) are polygons.

8. The grid device of claim 1, wherein the plurality of grid elements (20) is disposed along the grate (10) in such a manner that each of the plurality of grid elements (20) shares one or more common edges with others of the plurality of grid elements (20) surrounding it.

9. The grid device of claim 1, wherein two or more supports (30) extend in a transverse direction from the grate (10).

10. The grid device of claim 9, wherein the two or more supports (30) are arranged such that the grate (10) is at a cant angle θ with respect to a level plane.

11. The grid device of claim 1, wherein one or more curved support dampeners (31) are arranged on the bottom surface (10B) of the grate (10).

12. The grid device of claim 1, wherein each of the plurality of grid elements (20) along the folding axis (12) is divided into two or more pieces except at the top surface (10A) of the grate (10).

13. The grid device of claim 1, wherein two or more supports (30) extend in a transverse direction from the grate (10), and the supports (30) form cavities or one or more curved support dampeners (31) are arranged on the bottom surface (10B) of the grate (10) and the support dampeners (31) form cavities.

14. A cleaning system, comprising:
a container (40); and
a grid device comprising a grate (10) with a top surface (10A), a bottom surface (10B), and a plurality of grid elements (20) arranged in a plane along the grate (10), wherein each of the plurality of grid elements (20) comprises a top opening (21) of a width of $d_{top}$ in the top surface (10A) and a bottom opening (22) of width $d_{bottom}$ in the bottom surface (10B); wherein each of the plurality of grid elements (20) further comprises a plurality of walls (23) that extend from the edges of the top opening (21) on the top surface (10A) of the grate (10) to the corresponding edges of the bottom opening (22) on the bottom surface (10B) of the grate (10), wherein $d_{top}$ is larger than $d_{bottom}$, and wherein the grid device is arranged inside the container (40); and wherein
the grate (10) comprises one or more folding axes (12) defined by one or more folding means (11) along which the grate (10) can fold.

15. The cleaning system of claim 14 wherein the container (40) is arranged such that the bottom surface (10B) of the grate (10) rests upon one or more grate supports (41) arranged at a distance above the bottom of the container (40).

16. The cleaning system of claim 14, wherein $d_{top}$ is about 25% to about 70% larger than $d_{bottom}$.

17. The cleaning system of claim 14, wherein $d_{top}$ is about 30 mm to about 5 mm.

18. The cleaning system of claim 14, wherein $d_{bottom}$ is about 5 mm to about 30 mm.

19. The cleaning system of claim 14, wherein the grate (10) has a thickness of $d_{grate}$ that is about 15% to about 150% of the size of $d_{top}$.

20. The cleaning system of claim 14, wherein the grate (10) has a thickness of $d_{grate}$, and $d_{grate}$ is about 5 mm to about 30 mm.

21. The cleaning system of claim 14, wherein the top opening (21) and the bottom opening (22) of each of the plurality of grid elements (20) are polygons.

22. The cleaning system of claim 14, wherein the plurality of grid elements (20) is disposed along the grate (10) in such a manner that each of the plurality of grid elements (20) shares one or more common edges with others of the plurality of grid elements (20) surrounding it.

23. The cleaning system of claim 14, wherein two or more supports (30) extend in a transverse direction from the grate (10).

24. The cleaning system of claim 23, wherein the two or more supports (30) are arranged such that the grate (10) is at a cant angle θ with respect to a level plane.

25. The cleaning system of claim 14, wherein one or more curved support dampeners (31) are arranged on the bottom surface (10B) of the grate (10).

26. The cleaning system of claim 14, wherein each of the plurality of grid elements (20) along the folding axis (12) is divided into two or more pieces except at the top surface (10A) of the grate (10).

27. The cleaning system of claim 14, wherein two or more supports (30) extend in a transverse direction from the grate (10), and the supports (30) form cavities or one or more curved support dampeners (31) are arranged on the bottom surface (10B) of the grate (10) and the support dampeners (31) form cavities.

* * * * *